United States Patent [19]

Satou

[11] Patent Number: 4,668,764
[45] Date of Patent: May 26, 1987

[54] EASILY DYEABLE COPOLYESTER FIBER AND PROCESS FOR PREPARING THE SAME

[75] Inventor: Tetsuo Satou, Nobeoka, Japan

[73] Assignee: Asahi Kasei Kabushiki Kaisha, Osaka, Japan

[21] Appl. No.: 804,229

[22] Filed: Dec. 2, 1985

Related U.S. Application Data

[63] Continuation of Ser. No. 552,778, Nov. 17, 1983, abandoned.

[30] Foreign Application Priority Data

Nov. 18, 1982 [JP] Japan ................. 57-201074
Apr. 20, 1983 [JP] Japan ................. 58-68333

[51] Int. Cl.$^4$ ........................................... C08G 63/70
[52] U.S. Cl. ................................. 528/308.1; 528/272
[58] Field of Search ....................... 528/308.1, 272

[56] References Cited

U.S. PATENT DOCUMENTS 4,390,685 6/1983 Oka et al. ................. 528/308.1
4,426,516 1/1984 Kuriki et al. .............. 528/308.1

Primary Examiner—John Kight
Assistant Examiner—M. L. Moore
Attorney, Agent, or Firm—Finnegan, Henderson, Farabow, Garrett & Dunner

[57] ABSTRACT

Easily dyeable polyester fiber consisting of a copolyester having 80 to 98 mole % of ethylene terephthalate units, and having a degree of crystallinity ($X_c$) and a birefringence ($\Delta n$) satisfying the following relationship (1), and a peak temperature ($T_{max}$) at which the dynamic loss tangent (tan δ) measured at a frequency of 110 Hz becomes maximum and a maximum tan δ value (tan δ)$_{max}$ within the following ranges (2) and (3):

$$X_c(\%) < -710 \times \Delta n + 110 \tag{1}$$

$$90° C. < T_{max} \leq 107° C. \tag{2}$$

$$0.135 < (\tan \delta)_{max} \leq 0.300 \tag{3}$$

The fiber is prepared by extruding the copolyester having 80 to 98 mole % of ethylene terephthalate through a spinneret and taking up the extruded filaments at a take-up speed of not less than 5,000 m/min.

3 Claims, 3 Drawing Figures

EASILY DYEABLE COPOLYESTER FIBER AND PROCESS FOR PREPARING THE SAME

This application is a continuation of application Ser. No. 552,778, filed Nov. 17, 1983, now abandoned.

BACKGROUND OF THE INVENTION

1. Field of the Invention

The present invention relates to a polyester fiber of improved dyeability and to a process for the preparation thereof. More particularly, the present invention relates to a polyester fiber which can be dyed deep color under normal pressure and boiling conditions. That is, the present invention relates to an modified polyethylene terephthalate fiber which is easily dyeable while retaining the excellent properties inherent to polyethylene terephthalate, and a process for the preparation thereof.

2. Description of the Prior Art

Polyester fibers, particularly those consisting mainly of polyethylene terephthalate (hereinafter referred to as PET fiber), have a high degree of crystallinity and a high softening point, and thus, are excellent in mechanical properties, such as strength and elongation, thermal resistance and chemical resistance. Therefore, the PET fibers are widely used in the fields of industrial materials and garments.

On the other hand, the PET fibers have, in addition to the above-mentioned advantages, the disadvantages that deep color dyeing is difficult, pilling is likely to occur, static electricity is likely to generate and the hygroscopicity is low. Furthermore, because the PET fibers have various disadvantages concerning dyeing, especially they are difficult to be dyed deep color, the range of their use is limited.

In general, the PET fibers are dyed with a disperse dye because they contain a hydrophobic group in their molecular structure. Because the PET fibers are highly crystalline, and has a dense structure, they are dyed by either (1) high-temperature and high-pressure dyeing at a temperature of 120° C. to 130° C. or (2) carrier dyeing which is carried out at a temperature of about 110° C. or under normal pressure and boiling conditions. The high-temperature and high-pressure dyeing (1) has, however, the disadvantages that the operation of the machine or apparatus used for dyeing is complicated and the energy cost is high. Furthermore, when the PET fibers are dyed in the same dyeing bath in combination with other fibers, especially acrylic fibers, wool or the like, by the high-temperature and high-pressure dyeing method, the physical properties of the other fibers are deteriorated, for example, the resiliency is reduced. Therefore, it is substantially difficult to utilize this method. On the other hand, the carrier dyeing (2) has disadvantages in that the carrier as a dyeing auxiliary agent is difficult to handle, and treatment of the waste liquor is difficult, because the carrier generally is a harmful material. Furthermore, because the carrier occupies a dye-depositing site in the fiber, deep color dyeing is difficult or the migration of the dye is likely to occur. These phenomena may result in an unevenness in dyeing.

Therefore, a variety of methods have been proposed for overcoming the above-mentioned disadvantages of the PET fibers. One typical method is to introduce a copolymerizable component into a PET polymer.

For example, Japanese Examined Patent Publication (Kokoku) No. 34-10497 discloses (a) a method in which a compound containing a metal sulfonate group is copolymerized with polyethylene terephthalate. Japanese Examined Patent Publication (Kokoku) No. 54-38159 proposes (b) a method in which a compound containing an amino group is copolymerized with polyethylene terephthalate. These methods (a) and (b) are characterized by enabling the PET fibers to be easily dyed with a basic dye and an acid dye as well as disperse dye. Also, as a copolymerizable component used for enhancing only the dyeability of the PET fibers with a disperse dye, there are well known (c) dicarboxylic acids, for example, isophthalic acid and adipic acid, and polyalkylene glycols, for example, polyethylene glycol.

These methods all have disadvantages, however, for example, the method (a) is disadvantageous in that a metal sulfonate group-containing compound as the raw material is expensive, and further, polymerization and spinning cannot stably be carried out. A PET fiber containing an amino group-containing compound in a copolymerized form is disadvantageous in that the polymer has a poor thermal stability. Furthermore, in order to dye the PET fiber deep color to a satisfactory degree under normal pressure and boiling conditions without the use of any carrier, either of these methods (a) and (b) require that a large amount of the copolymerizable component should be copolymerized with polyethylene terephthalate as in the method (c). The use of a large amount of the copolymerizable component results in an extreme reduction in the excellent properties inherent to the PET fiber. In addition, if polyethylene glycol or the like is used as the copolymerizable component, another disadvantages, such as foaming during polymerization and discoloration of the polymer, arise.

As another method for enhancing the dyeability of the PET fiber, there is known a method using high speed spinning, as disclosed in Japanese Unexamined Patent Publication (Kokai) No. 55-107511, and U.S. Pat. Nos. 4,156,071, 4,134,882 and 4,195,051. However, this method is still unsatisfactory in dyeing the PET fiber deep color under normal pressure and boiling conditions without using a carrier. Furthermore, this method has the disadvantage that the shrinkage in boiling water is remarkably reduced as the take-up speed is increased.

It is also known to enhance the dyeability of the PET fiber by subjecting a polyester with which a metal sulfonate compound is copolymerized to high speed spinning (Japanese Unexamined Patent Publication (Kokai) No. 53-139820). Indeed, this method is effective for enhancing the dyeability, and is able to provide a fairly deep color under normal pressure and boiling conditions without the use of any carrier. However, as described hereinabove, the disadvantages of the polymer itself are still present. Furthermore, this method is unable to solve the problem of the reduction of the shrinkage in boiling water due to the high speed spinning.

In addition, Japanese Unexamined Patent Publication (Kokai) No. 57-161121 discloses a method for enhancing the dyeability of PET fibers in which PET fibers obtained by high speed spinning is heat treated. In this case, the PET fibers consist essentially of ethylene terephthalate homopolymer, and the dyeability of such fibers can be enhanced. However, the high speed spinning and the heat treatment cause the resultant fiber to exhibit a further reduced shrinkage in boiling water.

Generally, when a polyester is subjected to high speed spinning, the dyeability of the resultant fiber is improved to some degree, while a reduction in the shrinkage in boiling water due to the increase in the winding speed is outstanding. In the past, especially a winding speed of not less than 6,000 m/min inevitably reduced the shrinkage in boiling water to 4% or less. In order to enhance the dyeability by high speed spinning, while keeping a good balance of the strength and the elongation, the spinning operation should be carried out at a winding speed of not less than 5,000 m/min, preferably not less than 6,000 m/min. As an attempt to further enhance the dyeability, conventional copolymerized PET polymers were subjected to high speed spinning. However, this attempt was still unsatisfactory in improving the reduction in the shrinkage in boiling water.

Table 1 indicates the results of dyeability and shrinkage in boiling water measured for various copolyester fibers obtained by the high speed spinning thereof. It is apparent from the table that the reduction in the shrinkage in boiling water due to high speed spinning cannot be improved merely by subjecting the copolymerized polyesters to high speed spinning.

TABLE 1

| | Copolymerized component | Copolymerization ratio | Spinning speed (Km/min) | Degree of exhaustion 100° C. × 60 min | Shrinkage in boiling water (%) |
|---|---|---|---|---|---|
| 1 | Isophthalic acid | 5 mole % | 8 | 83.5 | 3.5 |
| 2 | Isophthalic acid | 10 mole % | 8 | 86.2 | 3.8 |
| 3 | Isophthalic acid | 15 mole % | 6 | 82.3 | 5.0 |
| 4 | Isophthalic acid | 15 mole % | 8 | 90.3 | 4.5 |
| 5 | Polyethylene glycol | 11 wt. % | 8 | 92.1 | 4.0 |
| 6 | Isophthalic acid/ polyethylene glycol | 5 mole % /3 wt. % | 8 | 88.2 | 4.7 |
| 7 | 5-sodium sulfoisophthalic acid | 2.3 mole % | 8 | 90.7 | 4.8 |
| 8 | Bisphenol A | 5 mole % | 6 | 84.4 | 5.0 |

SUMMARY OF THE INVENTION

The inventors of the present invention made extensive studies on the high speed spinning of a copolymerized polyester with a view to solve the above-mentioned disadvantages. In the course of the investigations, the inventors of the present invention discovered that for the purpose of preventing the reduction in the shrinkage in boiling water of the fiber and of enhancing the degree of exhaustion thereof, the degree of crystallinity ($X_c$) and the birefringence ($\Delta n$) of the copolymerized polyester fiber, and the peak temperature ($T_{max}$) at which the dynamic loss tangent (tan $\delta$) measured at a frequency of 110 Hz becomes maximum and the maximum tan $\delta$ value (tan $\delta)_{max}$, should satisfy specific relationships, respectively. Thus, this invention was accomplished.

That is, an object of the present invention is to provide a polyester fiber having a good dyeability which can be dyed satisfactorily deep color with a disperse dye under normal pressure and boiling conditions without the use of any carrier, while keeping the excellent physical and chemical properties, especially the shrinkage in boiling water, inherent to the PTE fiber at adequate levels, and a process for the preparation thereof.

By the term "adequate level of the shrinkage in boiling water" as used herein is meant that the shrinkage in boiling water is preferably in the range of 6% to 13%.

By the term "capable of being dyed satisfactorily deep color under normal pressure and boiling conditions" as used herein is meant that the degree of exhaustion is preferably about 80% or more, more preferably 85% or more, under the dyeing conditions of normal pressure boiling and a dyeing time of 60 minutes. Such a high level of the degree of exhaustion means that the polyester fiber can be dyed satisfactorily deep color with various color shades and, in addion, can be dyed deep color under normal pressure even in one bath dyeing in which the polyester fiber is concurrently dyed together with the other types of fibers.

For the purpose of attaining the above-mentioned object, the present invention provides an easily dyeable polyester fiber consisting of a copolyester having 80 to 98 mole % of ethylene terephthalate units as a recurring unit, and having a degree of crystallinity ($X_c$) and a birefringence ($\Delta n$) satisfying the following relationship (1), and a peak temperature ($T_{max}$) at which the dynamic loss tangent (tan $\delta$) measured at a frequency of 110 Hz becomes maximum and a maximum tan $\delta$ value (tan $\delta)_{max}$ within the following ranges (2) and (3):

$$X_c (\%) < -710 \times \Delta n + 110 \quad (1)$$

$$90° C. < T_{max} \leq 107° C. \quad (2)$$

$$0.135 < (\tan \delta)_{max} > 0.300 \quad (3)$$

DESCRIPTION OF THE PREFERRED EMBODIMENTS

Figure 1:
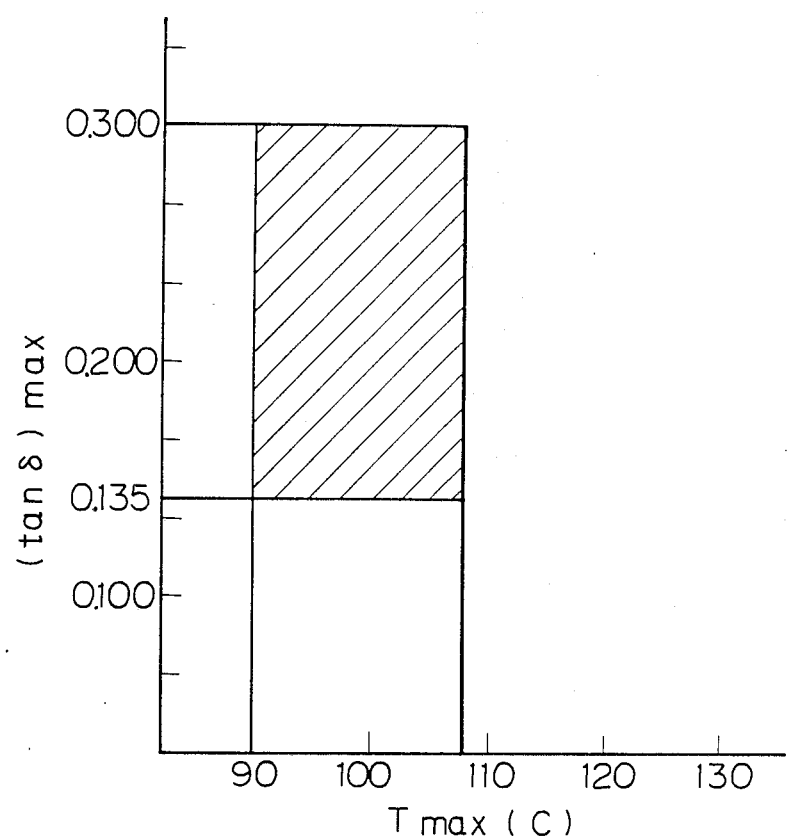
FIG. 1 is a graph illustrating the relationships of $T_{max}$ values and (tan $\delta)_{max}$ values.

The present invention is illustrated in more detail, below. It is necessary that the proportion of the copolymerizable component in the copolymerized polyethylene terephthalate of the present invention should be in the range of from 2 to 20 mole %, preferably from 5 to 13 mole %. If the copolymerization proportion is outside the above-mentioned range, it is difficult to obtain a fiber satisfying the relationship (1), (2) and (3), whereby a balance of an improvement in the dyeability and the physical properties of the fiber cannot be kept.

The copolymerizable component may be any compound as long as it can provide a fiber satisfying the relationships (1), (2) and (3). 1,4-cyclohexanedimethanol and/or 2,2-bis[4-(2-hydroethoxy)phenyl]propane may preferably be used because it is highly effective even if used in a relatively small amount of not more than 10 mole %.

1,4-cyclohexanedimethanol includes cis- and trans-forms. Either of these forms or a mixture thereof may be used.

The above-mentioned copolyester may contain a third component as other copolymerizable component in a small amount so long as the characteristics of the polyester are not substantially changed by its addition. In this case, the total amount of copolymerizable components should not exceed 20 mole % for the reason described hereinabove. Examples of the copolymerizable third component usable for the present invention include dicarboxylic acids, for example, 2,5-dibromoterephthalic acid, diphenyldicarboxylic acid, naphthalenedicarboxylic acid, diphenyl ether dicarboxylic acid, diphenoxyethanedicarboxylic acid, adipic acid, sebacic acid, phthalic acid, isophthalic acid and cyclohexanedicarboxylic acid; oxycarboxylic acids, for example, oxybenzoic acid; and dihydroxy compounds, for example, triethylene glycol, propylene glycol, pentamethylene glycol, hexamethylene glycol, diethylene glycol, cyclohexane diols, bisphenol A, tetrabromobisphenol A, neopentyl glycol and butane diols. Such alkylene glycols as polyethylene glycol and polypropylene glycol may be used.

In the case where 1,4-cyclohexanedimethanol alone is used as the copolymerizable component, the resultant fiber is also characterized by an excellent light fastness when it is dyed.

It is important that the copolyester of the present invention has a degree of crystallinity ($X_c$) and a birefringence ($\Delta n$) satisfying the following relationship (1):

$$X_c(\%) < -710 \times \Delta n + 110 \quad (1)$$

In the case of $X_c(\%) \geq -710 \times \Delta n + 110$, the shrinkage in boiling water of the fiber is remarkably low even if the relationships (2) and (3) are simultaneously satisfied.

For example, this is the case for a copolyester fiber obtained by high speed spinning which is described in Japanese Unexamined Patent Publication (Kokai) No. 53-139820.

In the present invention, it is necessary that the copolyester fiber should have a peak temperature ($T_{max}$) at which the dynamic loss tangent (tan δ) measured at a frequency of 110 Hz becomes maximum and a maximum tan δ value (tan δ)$_{max}$ within the following ranges (2) and (3):

$$90° C. < T_{max} \leq = 107° C. \quad (2)$$

$$0.135° (\tan \delta)_{max} \leq 0.300 \quad (3)$$

The above-mentioned ranges are represented by oblique lines in FIG. 1.

A fiber having a $T_{max}$ greater than 120° C. or having a $T_{max}$ greater than 107° C. but not greater than 120° C. and a (tan δ)$_{max}$ less than 0.110 has no improved dyeability. This type of fiber corresponds to a conventional drawn polyester fiber. More preferably, $T_{max}$ and (tan δ)$_{max}$ satisfy the ranges: 95° C.≦$T_{max}$≦105° C.; and 0.160≦(tan δ)$_{max}$≦0.28.

A copolyester fiber having a $T_{max}$ not greater than 107° C. and a (tan δ)$_{max}$ not greater than 0.135 has a good dyeability but is difficult to stably produce unless the polymer is especially subjected to a viscosity-reducing treatment or the like.

A copolyester fiber having a $T_{max}$ not greater than 90° C. and a (tan δ)$_{max}$ greater than 0.135 or a $T_{max}$ greater than 90° C. but not greater than 120° C. and a (tan δ)$_{max}$ not less than 0.300, has deteriorated physical properties with respect to elongation, strength, melting point and the like because of its relatively high copolymerization proportion (the copolymerization proportion is 20 mole % or more).

A copolyester fiber having a $T_{max}$ greater than 107° C. but not greater than 120° C. and a (tan δ)$_{max}$ greater than 0.110 but not greater than 0.300 has a good balance of the physical properties and a somewhat enhanced dyeability but cannot still be dyed satisfactorily deep color under normal pressure and boiling conditions (this type of fiber corresponds to a polyester fiber having a copolymerization proportion of less than 2 mole % which is obtained by high speed spinning).

The polyester fiber of the present invention may be prepared in the following manner. First, an ethylene terephthalate polymer containing 2 to 20 mole % of 1,4-cyclohexanedimethanol and/or 2,2-bis[4-(2-hydroxyethoxy)phenol]propane in copolymerized form is extruded from a spinneret having a plurality of holes and taken up at a high spinning speed by using a winding speed of not less than 5,000 m/min, preferably not less than 7,000 m/min. The thus prepared fiber may be used in the same manner as a conventional drawn fiber without being subjected to drawing. If the winding speed is less than 5,000 m/min, the fiber has no satisfactory strength and excessively high values of elongation and shrinkage in boiling water, and thus, it is practically difficult to use it without drawing. Even if the fiber is subjected to a conventional drawing procedure so as to improve the mechanical properties thereof, the drawn fiber has a poor dyeability and thus, cannot be dyed satisfactorily deep color under normal pressure and boiling conditions.

The high speed spinning of the copolyester at a winding speed of not less than 5,000 m/min may be effected by a well known process. However, a group of the monofilaments extruded from the spinneret is passed through a heating zone defined over a length of from 5 cm to 50 cm from the bottom surface of the spinneret and maintained at a temperature of from 150° C. to 300° C., preferably 180° C. to 250° C., and subsequently, the group of monofilaments is bundled into a filament bundle by means of a bundling guide, such as a snail wire, air sucker, or oiling nozzle guide as disclosed in Japanese Patent Application No. 57-89754, positioned at least 5 cm, preferably 5 cm to 120 cm, beneath the point of completion of fining of the group of monofilaments, and taken up the filament bundle at a take-up speed of not less than 5,000 m/min while maintaining the tension imposed on the filament bundle not more than 0.43 g/d, preferably 0.1 to 0.33 g/d. The take-up is carried out at a position of 2 to 4 m, preferably 2.5 to 3.5 m, from the bottom surface of the spinneret.

The "point of completion of filament fining" as used herein refers to a point at which the extruded filaments suddenly become fine during spinning so that they have a fineness finally desired, and corresponds to the point of completion of necking elongation as described by G. Perez and C. Lecluse, "International Man-Made Fibers Conference", Dornbirn, Austria, 1979.

The copolyester may be prepared by well known polymerization processes. A continuous or batch polymerization process may be used. In the polymerization procedure, antimony oxides, calcium acetate or amorphous germanium is generally used as an ester interchange catalyst. Antimony oxides and amorphous germanium are preferable from the viewpoints of dyeability and fiber tone.

The copolyester may contain a suitable light stabilizer, thermal stabilizer or flatting agent so long as the effects and objects of the present invention are not hindered.

The copolyester fiber thus obtained, according to the present invention, has a dyeing property that it can be dyed satisfactorily deep color with a disperse dye under normal pressure and boiling conditions without the use of any carrier, while the excellent mechanical properties and thermal properties inherent to the PET fiber are retained. Furthermore, another feature of the present invention is that the problem of the remarkable reduction in shrinkage in boiling water occurring at a winding speed of not less than 5,000 m/min when the dyeability of the copolyester fiber is conventionally improved by high speed spinning, can be solved.

The remarkable reduction in shrinkage in boiling water represents the following problems in the subsequent post treatment steps. That is, 1. after dyeing in the dyeing step, a sink mark, puckering, and unevenness in dyeing are likely to be generated in the dyed fabric, and the fabric is difficult to unwrinkle; 2. the fabric is difficult to unwrinkle in the heat setting step, and, thus, the operating efficiency is poor; 3. the operating efficiency of the sizing step is inferior; and, 4. since the shrinkage is low in the relaxing step, the fabric does not become voluminous, and thus, exhibits no excellent hand inherent to the polyester fiber.

The present invention overcomes all these disadvantages.

Moreover, in the case where 1,4-cyclohexanedimethanol is used as the copolymerizable component, the resultant fiber is also characterized by an excellent light fastness when it is dyed.

Therefore, the copolyester fiber of the present invention can be directly used in various fields of application of the conventional PET fibers, and because of its excellent dyeability, can be used in combination with other types of fibers.

The parameters for specifying the properties referred to in this specification may be measured by the following methods.

Tensile Strength and Elongation

The tensile strength and elongation are measured with a tensile tester, Autograph DSC 100, manufactured by Shimazu Seisakusho Co., Ltd., under the conditions of an initial yarn length of 20 cm and stress rate of 20 cm/min.

Shrinkage in Boiling Water

Shrinkage in boiling water is determined by the following formula:

$$\text{Shrinkage in boiling water (\%)} = \frac{L_0 - L}{L_0} \times 100$$

In the formula, $L_0$ is the length of a sample under a load of 0.1 g/d, and L is the length of the sample under a load of 0.1 g/d after the sample is dipped in boiling water for 30 minutes without the load.

Degree of Exhaustion

A sample is dyed with a disperse dye, Resolin Blue FBL (C.I. Disperse Blue 56, manufactured by Bayer A.G.), at a dye concentration of 3% o.w.f. and at a liquor-to-goods ratio of 100:1, under a boiling condition under normal pressure. Further, a dispersing agent, Diper TL (trademark of Marubishi Yuka Co., Ltd.,), is added to the dye bath in an amount of 1 g/l, which dye bath is adjusted to a pH of 6 by adding acetic acid. After dyeing for 1 hour, the dye bath is diluted with a mixture of water and acetone (1:1) and the absorbance (U) is measured at a wavelength of 620 mµ on a spectrophotometer, UV-200, manufactured by Shimazu Seisakusho Co., Ltd., using a 1 cm Corex cell. Further, the initial dye bath is diluted and the absorbance ($U_0$) is measured in the same manner as mentioned above. The degree of exhaustion is determined by the following formula:

$$\text{Degree of exhaustion (\%)} = \frac{U_0 - U}{U_0} \times 100$$

Light Fastness

A sample is dyed in the manner as in the evaluation of the degree of exhaustion described above except that the concentration of dye is 1% o.w.f. and the dyeing time is 90 minutes. The sample is subjected to the light fastness test according to JIS (Japanese Industrial Standard) L-0842, in a fadeometer, at 63° C for 27.5 hrs. The light fastness is evaluated with the naked eye by 3 grades, o for the highest, Δ for middle and x for the lowest.

Melting Point

A melting curve is measured by heating 7 mg of a sample in $N_2$ gas atmosphere at a rate of temperature increase of 16° C./min using a differential scanning calorimeter, 1B, manufactured by Perkin-Elmer Co., Ltd. The melting point is determined as the peak temperature of the resultant curve.

Dynamic Loss Tangent (tan δ)

Figure 2:
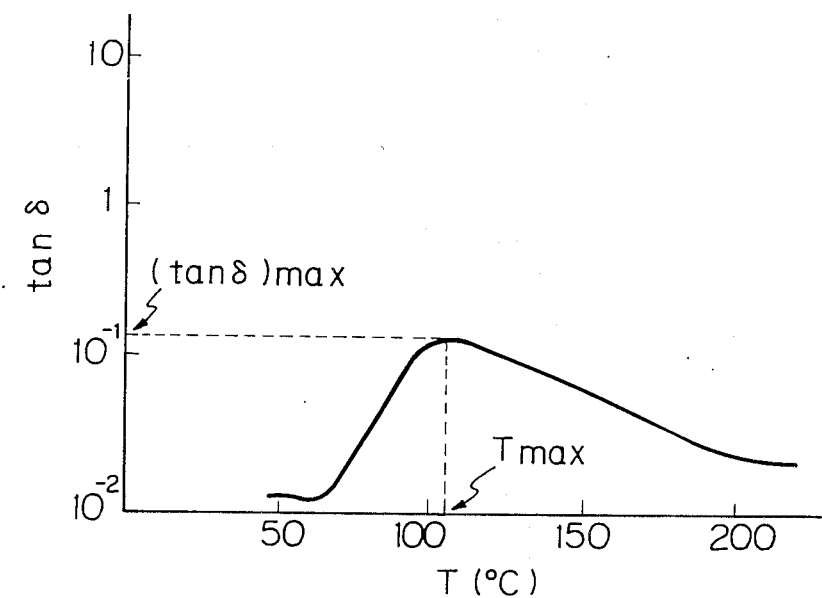
FIG. 2 is a graph schematically illustrating the dynamic loss tangent (tan $\delta$)—temperature (T) curve.

The dynamic loss tngent (tan δ) is determined by using an apparatus for measurig dynamic viscoelasticity, Rheo-Vibron DDV-II, manufactured by Toyo Baldwin Co., Ltd., at a sample amount of 0.1 mg and at a frequency of 110 Hz in dry air at a temperature increasing at a rate of 10° C./min. Thus, the tan δ and E' (dynamic modulus) are measured to obtain a tan δ-temperature curve as schematically illustrated in FIG. 2. From the curve, the peak temperature ($T_{max}$) at which tan δ becomes maximum and the maximum tan δ value (tan δ)$_{max}$ are determined.

Birefringence (Δn)

The birefringence is the difference between the refractive index to light polarized in the direction perpendicular to the fiber axis (n⊥) and the refractive index to light polarized in the direction parallel to the fiber axis (n∥) and is represented by the following formula:

$$\text{Birefringence } (\Delta n) = n\| - n\bot$$

The refractive indices are measured in usual way using a polarizing microscope provided with a Berek compensator, while using tricresyl phosphate as an immersion liquid.

Degree of Crystallinity ($X_c$)

The degree of crystallinity ($X_c$) is determined by measuring the X-ray diffraction intensity in the by the equatorial reflection equatorial direction method. The measurement is carried out by using an X-ray generator, RU-200PL, manufactured by Rigaku Denki Co., Ltd., a goniometer, SG-9R, manufactured by Rigaku Denki Co., Ltd., a scintillation counter and a pulse height analyzer, with Cu-Kα ray (wavelength λ = 1.5418 Å) monochromatized by a nickel filter. A fiber sample is set in an aluminum sample holder so that the fiber axis is perpendicular to the plane of X-ray diffraction. The thickness of the sample is adjusted to about 0.5 mm. The X-ray generator is operated at 50 kV and 100 mA. The diffraction intensity is recorded from 38° to 7° of $2\theta$ at a scanning speed of 1°/min, a chart speed of 20 mm/min, a time constant of 0.5 sec, a divergent slit of $\frac{1}{2}$°, a receiving slit of 0.3 mm, and a scattering slit of $\frac{1}{2}$°. The full scale deflection of the recorder is set so that the entire diffraction curve remains on the scale.

Generally, a polyethylene terephthalate fiber has three major reflections (at faces of (010), (110) and (100) in the order of from lower angle to higher angle) on the equatorial line in the range of from 17° to 26° of $2\theta$. An example of the X-ray diffraction intensity curve of a polyethylene terephthalate fiber is shown in FIG. 3, in which a is a portion of the X-ray diffraction intensity attributed to the crystalline region and b is a portion of the X-ray diffraction intensity attributed to the amorphous region.

Figure 3:
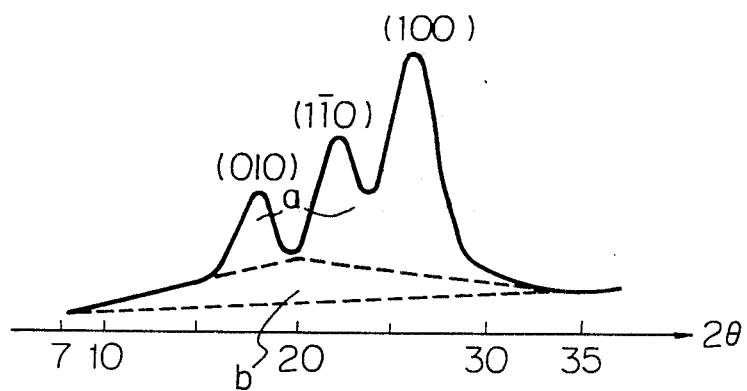
FIG. 3 is a graph schematically illustrating a X-ray diffraction intensity of an ethylene terephthalate polymer.

A base line is established by drawing a straight line between 7° and 35° of $2\theta$ on the resultant X-ray diffraction intensity curve, as shown in FIG. 3 by a dotted line. As also shown in FIG. 3 by another dotted line, the crystalline portion and the amorphous portion are separated by drawing straight lines along the tail at the lower angle side and the tail at the higher angle side from the peak positioned near the angle of 20° of $2\theta$. The degree of crystallinity ($X_c$) is determined by an area analysis method according to the following equation:

$$\text{Degree of crystallinity (\%)} = \frac{\text{Scattering intensity in crystalline portion}}{\text{Total scattering intensity}} \times 100$$

The present invention will further be illustrated below by way of illustrative but not limitative examples. In the examples, all parts are by weight.

EXAMPLE 1

100 parts of dimethyl terephthalate (DMT), 70 parts of ethylene glycol (EG), 7.5 parts (corresponding to about 10 mole %) of 1,4-cyclohexanedimethanol, 0.047 part of manganese acetate and 0.04 part of antimony oxide were charged into an autoclave provided with a fractionating column. The mixture was heated at a temperature of 180° C. to 230.° C. for 2.5 hours while distilling off methanol being formed. After not less than 97% of the theoretical amount of methanol was distilled off, 0.5 part of titanium oxide was added in the form of a dope in EG, and then the reaction mixture was transferred to a vacuum autocalve. 0.03 part of phosphorous acid was added, the temperature was raised to 265° C. while gradually evacuating the autoclave, and the polymerization was effected at 280° C. under 0.5 mmHg for 2 hours. Thus, a polymer having a melting point of 233° C. and an intrinsic viscosity of 0.68 was obtained.

The polymer was ground into a pellet form and dried in vacuo at 120° C. for 20 hours to adjust the water content to not more than 25 ppm.

The copolymerized polymer was melt spun into a copolyester multifilament of 50 deniers/24 filaments using spinning machine while taking up the spun multifilament at a take-up seep of 6,000 m/min. The spinning machine had a spinneret of 24 holes having a diameter of 0.23 mm, a heating cylinder of a length of 40 cm kept at a temperature of 200° C. and provided immediately below the spinneret, an oiling nozzle guide positioned 110 cm beneath the spinneret and a high-speed take-up unit positioned 3 m beneath the spinneret. The molten polymer of a temperature of 282° C. was extruded at a rate of 33.3 g/min from the spinneret, and the filaments were passed through the heating cylinder, bundled by the oiling nozzle guide, and then taken up. The tension of the filament bundle measured at 10 cm beneath the oiling nozzle guide was 0.29 g/d.

The $T_{max}$, $(\tan \delta)_{max}$, degree of crystallinity ($X_c$) and birefringence ($\Delta n$) of the resultant multifilament were measured. The results are shown in Table 2, which proves that they are within the ranges defined in the claims.

Other properties of the multifilament are shown in Table 3. It is apparent from Table 3 that the fiber has a shrinkage in boiling water as high as those of usual drawn polyester fibers, and a satisfactory strength and elongation. Further, the value of the degree of exhaustion exceeding 80% proves that the fiber can be dyed satisfactorily deep color under normal pressure and boiling conditions. The light fastness is also good.

EXAMPLE 2

The procedure as used in Example 1 was repeated, except that the spun multifilament was taken up at a take-up speed of 8,000 m/min, and the temperature in the heating cylinder was 250° C.

The point of completion of filament fining was 55 cm beneath the bottom surface of the spinneret, the position of the oiling nozzle guide was 75 cm beneath the point of completion of filament fining, and the tension of the filament bundle was 0.25 g/d within 30 cm beneath the bundling guide.

The measured values of $T_{max}$, $(\tan \delta)_{max}$, degree of crystallinity ($X_c$) and birefringence ($\Delta n$) of the resultant fiber are shown in Table 2, which proves that they are within the ranges defined in the claims.

Other results are also shown in Table 3. Despite of the increase of the take-up speed as compared with Example 1, the shrinkage in boiling water is still high, and the elongation and degree of exhaustion are even better.

EXAMPLE 3

100 parts of DMT, 70 parts of EG, 8.0 parts (corresponding to about 10 mole %) of 2,2-bis-[4-(2-hydroxyethoxy)-phenyl]-propane, 0.047 part of manganese acetate and 0.04 part of antimony oxide were charged into an autoclave provided with a fractionating column. The mixture was heated at a temperature of 180° C. to 230° C. for 3 hours and 10 minutes while distilling off methanol being formed. After not less than 97% of the theoretical amount of methanol was distilled off, the reaction mixture was transferred to a vacuum autoclave. 0.03 part of phosphorous acide and 0.04 part of a nonoxdizing agent were added, the temperature was raised to 260° C. while gradually evacuating the autoclave, and the polymerization was effected at 285° C. under 0.5 mmHg for 2.5 hours. Thus, a polymer having a melting point of 235° C. and an intrinsic viscosity of 0.65 was obtained.

The polymer was then spun into a multifilament in the manner as mentioned in Example 2, except that the temperature of the molten polymer being extruded was 285° C.

The measured values of $T_{max}$, $(\tan \delta)_{max}$, degree of crystallinity ($X_c$) and birefringence ($\Delta n$) of the resultant fiber are shown in Table 2, which proves that they are within the ranges defined in the claims.

Other results are also shown in Table 3. It is apparent from the table that the fiber has a shrinkage in boiling water as high as those of usual drawn polyester fibers, and a satisfactory strength and elongation. Further, the value of the degree of exhaustion exceeding 80% proves that the fiber can be dyed satisfactorily deep color under normal pressure and boiling conditions.

EXAMPLE 4

100 parts of DMT, 70 parts of EG, 4.0 parts of 1,4-cyclohexanedimethanol, 3.0 parts of 2,2-bis-[4-(2-hydroxyethoxy)-phenyl]-propane, 0.047 part of manganese acetate and 0.04 part of antimony oxide were charged into an autoclave provided with a fractionating column. The mixture was heated at a temperature of 180° C. to 230° C. for 3.5 hours while distilling off methanol being formed. After not less than 97% of the theoretical amount of methanol was distilled off, the reaction mixture was transferred to a vacuum autoclave. 0.03 part of phosphorous acid was added, the temperature was raised to 265° C. while gradually evacuating the autoclave, and the polymerization was effected at 285° C. under 0.5 mmHg for 2 hours. Thus, a polymer having a melting point of 230° C. and an intrinsic viscosity of 0.66 was obtained.

The polymer was then spun into a multifilament as mentioned in Example 2.

The measured values of $T_{max}$, $(\tan \delta)_{max}$, degree of crystallinity ($X_c$) and birefringence ($\Delta n$) of the resultant fiber are shown in Table 2, which proves that they are within the ranges defined in the claims.

Table 3 also shows that the fiber has a high shrinkage in boiling water and can be dyed satisfactorily deep color under normal pressure and boiling conditions.

EXAMPLE 5

The procedure as in Example 1 was repeated, except that 3.8 parts (corresponding to about 5 mole %) of 1,4-cyclohexanedimethanol was used, to obtain a polymer having a melting point of 238° C. and an intrinsic viscosity of 0.68.

The polymer was then spun into a multifilament as mentioned in Example 2, except that the temperature of the molten polymer being extruded was 285° C.

The measured values of $T_{max}$, $(\tan \delta)_{max}$, degree of crystallinity ($X_c$) and birefringence ($\Delta n$) of the resultant fiber are shown in Table 2, which proves that they are within the ranges defined in the claims.

Other physical properties of the multifilament are shown in Table 3. It is apparent from the table that the fiber has a shrinkage in boiling water as high as those of usual drawn polyester fibers, and a satisfactory strength and elongation. Further, the value of the degree of exhaustion exceeding 80% proves that the fiber can be dyed satisfactorily deeply at boiling under normal pressure. The light fastness is also good.

EXAMPLE 6

An ethylene terephthalate polymer having 15 mole % of 1,4-cyclohexanedimethanol copolymerized in a conventional manner and having a melting point of 228° C. and an intrinsic viscosity of 0.67 was spun into a multifilament as mentioned in Example 2.

The measured values of $T_{max}$, $(\tan \delta)_{max}$, degree of crystallinity ($X_c$) and birefringence ($\Delta n$) of the resultant fiber are shown in Table 2, which proves that they are within the ranges defined in the claims.

Table 3 also shows that the fiber has such a high shrinkage in boiling water that cannot be attained in conventional high speed spinning methods and that the fiber can be dyed satisfactorily deep color under normal pressure and boiling conditions.

COMPARATIVE EXAMPLE 1

The copolyester obtained by the procedure described in Example 1 was molten and extruded through a spinneret as in Example 1 at a temperature of 282° C., and the spun filaments were passed through a cooling zone and taken up at a speed of 800 m/min. Immediately thereafter, the resultant undrawn multifilament yarn was drawn at a draw ratio of 3.617 and at a temperature of 80° C.

The measured values of $T_{max}$ and $(\tan \delta)_{max}$ of the resultant fiber are shown in Table 2, which shows that they are not within the ranges defined in Table 2.

The value of the degree of exhaustion shown in Table 3 show that the fiber has a poor dyeability so that it is necessary to dye it by the high-pressure dyeing method or carrier dyeing method.

COMPARATIVE EXAMPLE 2

Polyethylene terephthalate obtained from terephthalic acid and ethylene glycol and having a melting point of 250° C. and an intrinsic viscosity of 0.70 was spun into a multifilament as mentioned in Example 1, except that the temperature of the molten polymer being extruded was 292° C.

The point of completion of filament fining was 5 cm beneath the bottom surface of the spinneret, the position of the oiling nozzle guide was 110 cm beneath the point of completion of filament fining, and the tension of the filament bundle was 0.25 g/d at 10 cm beneath the oiling nozzle guide.

The measured values of $T_{max}$, $(\tan \delta)_{max}$, degree of crystallinity ($X_c$) and birefringence ($\Delta n$) of the resultant fiber are shown in Table 2, which shows that they are not within the ranges defined in the claims.

The data in Table 3 show that the fiber cannot be dyed satisfactorily deep color under normal pressure and boiling conditions and that the fiber has an extremely low shrinkage in boiling water.

COMPARATIVE EXAMPLE 3

The polymer as mentioned in Comparative Example 2 was spun into a multifilament as mentioned in Example 2, except that the take-up speed was 8,000 m/min.

The point of completion of filament fining was 50 cm beneath the bottom surface of the spinneret, the position of the oiling nozzle guide was 80 cm beneath the point of completion of filament fining, and the tension of the filament bundle was 0.26 g/d at 10 cm beneath the oiling nozzle guide.

The measured values of $T_{max}$, $(\tan \delta)_{max}$, degree of crystallinity ($X_c$) and birefringence ($\Delta n$) of the fiber are shown in Table 2, which shows that they are not within the ranges defined in the claims.

The data in Table 3 show that the fiber cannot be dyed satisfactorily deep color under normal pressure and boiling conditions, though the fiber has a higher dyeability as compared with that of Comparative Example 2. The fiber has an extremely low shrinkage in boiling water.

TABLE 2

| Example No. | $T_{max}$ °C. | $(\tan \delta)_{max}$ | Birefringence $n \times 10^3$ | Degree of crystallinity $X_c$:% |
|---|---|---|---|---|
| 1 | 103 | 0.238 | 93.4 | 35 |
| 2 | 101 | 0.195 | 95.4 | 37 |
| 3 | 102 | 0.188 | 89.5 | 30 |
| 4 | 100 | 0.201 | 92.1 | 33 |
| 5 | 104 | 0.183 | 92.4 | 36 |
| 6 | 97 | 0.275 | 88.2 | 30 |
| Comparative 1 | 114 | 0.204 | 147.5 | 42 |
| Comparative 2 | 117 | 0.224 | 98.2 | 50 |
| Comparative 3 | 113 | 0.132 | 109.6 | 57 |

TABLE 3

| Example No. | Strength g/d | Elongation % | Shrinkage in boiling water % | Degree of exhaustion % | Melting point °C. | Light fastness |
|---|---|---|---|---|---|---|
| 1 | 3.8 | 40.6 | 11.8 | 90.5 | 236 | o |
| 2 | 3.6 | 24.5 | 6.8 | 91.8 | 239 | o |
| 3 | 3.3 | 35.2 | 7.0 | 88.1 | 232 | Δ |
| 4 | 3.5 | 30.1 | 7.2 | 91.2 | 231 | o~Δ |
| 5 | 3.8 | 23.3 | 6.8 | 86.7 | 241 | o |
| 6 | 3.4 | 32.5 | 8.2 | 92.2 | 229 | o |
| Comparative 1 | 4.2 | 20.1 | 11.0 | 67.7 | 236 | o |
| Comparative 2 | 4.1 | 38.1 | 3.6 | 64.3 | 268 | o |
| Comparative 3 | 4.0 | 23.3 | 2.4 | 69.3 | 270 | o |

I claim:

1. Easily dyeable polyester fiber consisting of a copolyester having 80 to 98 mole % of ethylene terephthalate units, and having a degree of crystallinity ($X_c$) and a birefringence ($\Delta n$) satisfying the following relationship (1), and a peak temperature ($T_{max}$) at which the dynamic loss tangent $\delta(\tan \delta)$ measured at a frequency of 110 Hz becomes maximum and a maximum tan $\delta$ value (tan $\delta$) max within the following ranges (2) and (3):

$$X_c(\%) < -710 \times \Delta n + 110 \tag{1}$$

$$90° \text{ C.} < T_{max} \leq 107° \text{ C.} \tag{2}$$

$$0.135 < (\tan\delta)_{max} \leq 0.300 \tag{3}$$

and having a shrinkage in boiling water falling within a range of 6% to 13% wherein the monomer copolymerized with ethylene terephthalate is 1,4-cyclohexanedimethanol or 2,2-bis-propane.

2. A fiber as claimed in claim 1, wherein the copolyester contains 5 to 13 mole % of comonmer units.

3. A fiber as claimed in claim 1, wherein the fiber is prepared by melt spinning the copolymer at a high spinning speed of not less than 5000 m/min and without subjecting the spun fiber to heat treatment.

* * * * *